(12) United States Patent  (10) Patent No.: US 9,161,226 B2
Bender et al.  (45) Date of Patent: Oct. 13, 2015

(54) ASSOCIATING SERVICES TO PERIMETERS

(75) Inventors: Christopher Lyle Bender, Kitchener (CA); Graham Russell, Cambridge (CA); Natalie Michelle Silvanovich, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/275,097

(22) Filed: Oct. 17, 2011

(65) Prior Publication Data

US 2013/0097316 A1  Apr. 18, 2013

(51) Int. Cl.
*G06F 15/173* (2006.01)
*H04W 12/08* (2009.01)
*H04L 29/06* (2006.01)
*H04L 29/08* (2006.01)

(52) U.S. Cl.
CPC ............ *H04W 12/08* (2013.01); *H04L 63/102* (2013.01); *H04L 67/12* (2013.01)

(58) Field of Classification Search
USPC .......................... 709/225, 229, 226, 203, 224
See application file for complete search history.

(56) References Cited

U.S. PATENT DOCUMENTS

| 4,815,128 A | 3/1989 | Malek |
| 4,837,812 A | 6/1989 | Takahashi et al. |
| 4,945,556 A | 7/1990 | Namekawa |
| 4,972,457 A | 11/1990 | O'Sullivan |
| 4,991,197 A | 2/1991 | Morris |
| 5,220,604 A | 6/1993 | Gasser et al. |
| 5,408,520 A | 4/1995 | Clark et al. |
| 5,606,594 A | 2/1997 | Register et al. |
| 5,774,551 A | 6/1998 | Wu et al. |
| 5,802,483 A | 9/1998 | Morris |
| 5,826,265 A | 10/1998 | Van Huben et al. |
| 5,850,515 A | 12/1998 | Lo et al. |
| 5,864,765 A | 1/1999 | Barvesten |
| 5,987,440 A | 11/1999 | O'Neil et al. |

(Continued)

FOREIGN PATENT DOCUMENTS

| CA | 2505343 | 6/2010 |
| CN | 101523878 | 9/2009 |

(Continued)

OTHER PUBLICATIONS

Research in Motion, "BlackBerry Bridge App 2.1 and Blackberry PlayBook Tablet 2.1, Security Technical Overview"; Version: 2.1; Jul. 17, 2012; 43 pages.

(Continued)

*Primary Examiner* — Vivek Srivastava
*Assistant Examiner* — Normin Abedin
(74) *Attorney, Agent, or Firm* — Fish & Richardson P.C.

(57) ABSTRACT

In some implementations, a method includes receiving, from a user of a first device, a request to enable access, through a second device, to a server resource account of an enterprise. The first device includes a first enterprise perimeter including an internal resource and a first enterprise identifier and configured to prevent external resources from accessing the internal resource. A request is wirelessly transmit, to the second device, to the second device for a second enterprise identifier assigned to a second enterprise perimeter included in the second device. Whether to grant access to the internal resource is determined based on a first enterprise identifier assigned to the first device and a second enterprise identifier assigned to the second device.

20 Claims, 4 Drawing Sheets

(56) References Cited

U.S. PATENT DOCUMENTS

| | | |
|---|---|---|
| 5,987,611 A | 11/1999 | Freund |
| 6,052,735 A | 4/2000 | Ulrich et al. |
| 6,088,693 A | 7/2000 | Van Huben et al. |
| 6,105,132 A | 8/2000 | Fritch et al. |
| 6,125,447 A | 9/2000 | Gong |
| 6,131,136 A | 10/2000 | Liebenow et al. |
| 6,219,694 B1 | 4/2001 | Lazaridis et al. |
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,292,798 B1 | 9/2001 | Dockter et al. |
| 6,343,313 B1 | 1/2002 | Salesky et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,490,289 B1 | 12/2002 | Zhang et al. |
| 6,516,421 B1 | 2/2003 | Peters |
| 6,647,388 B2 | 11/2003 | Numao et al. |
| 6,668,323 B1 | 12/2003 | Challener et al. |
| 6,745,047 B1 | 6/2004 | Karstens et al. |
| 6,748,543 B1 | 6/2004 | Vilhuber |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,895,502 B1 | 5/2005 | Fraser et al. |
| 6,901,429 B2 | 5/2005 | Dowling |
| 6,957,330 B1 | 10/2005 | Hughes |
| 6,976,241 B2 | 12/2005 | Cruz et al. |
| 6,978,385 B1 | 12/2005 | Cheston et al. |
| 6,999,562 B2 | 2/2006 | Winick |
| 7,042,988 B2 | 5/2006 | Juitt et al. |
| 7,076,239 B2 | 7/2006 | Kirkup et al. |
| 7,076,797 B2 | 7/2006 | Loveland |
| 7,146,638 B2 | 12/2006 | Malcolm |
| 7,187,678 B2 | 3/2007 | Cunetto et al. |
| 7,246,374 B1 | 7/2007 | Simon et al. |
| 7,315,750 B2 | 1/2008 | Chou et al. |
| 7,330,712 B2 | 2/2008 | Kirkup et al. |
| 7,331,058 B1 | 2/2008 | Gladney |
| 7,400,878 B2 | 7/2008 | Hassan et al. |
| 7,526,800 B2 | 4/2009 | Wright et al. |
| 7,574,200 B2 | 8/2009 | Hassan et al. |
| 7,603,466 B2 | 10/2009 | Kilian-Kehr et al. |
| 7,721,087 B1 | 5/2010 | DiPasquo et al. |
| 7,734,284 B2 | 6/2010 | Adams et al. |
| 7,751,331 B1 | 7/2010 | Blair et al. |
| 7,765,185 B2 | 7/2010 | Rangadass |
| 7,793,355 B2 | 9/2010 | Little et al. |
| 7,869,789 B2 | 1/2011 | Hassan et al. |
| 7,886,053 B1 | 2/2011 | Newstadt et al. |
| 7,917,963 B2 | 3/2011 | Goyal et al. |
| 7,921,452 B2 | 4/2011 | Ridlon et al. |
| 8,005,469 B2 | 8/2011 | Adams et al. |
| 8,074,078 B2 | 12/2011 | Brown et al. |
| 8,208,900 B2 | 6/2012 | Adler et al. |
| 8,495,700 B2 | 7/2013 | Shahbazi |
| 8,495,731 B1 | 7/2013 | Mar et al. |
| 8,503,340 B1 | 8/2013 | Xu |
| 2001/0047485 A1 | 11/2001 | Brown et al. |
| 2001/0056549 A1 | 12/2001 | Pinault et al. |
| 2002/0013815 A1 | 1/2002 | Obradovich et al. |
| 2002/0019944 A1 | 2/2002 | Kou |
| 2002/0031230 A1 | 3/2002 | Yu et al. |
| 2002/0087880 A1 | 7/2002 | Rhoades |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0026220 A1 | 2/2003 | Uhlik et al. |
| 2003/0031184 A1 | 2/2003 | Cunetto et al. |
| 2003/0035397 A1 | 2/2003 | Haller et al. |
| 2003/0054860 A1 | 3/2003 | Chen |
| 2003/0061087 A1 | 3/2003 | Srimuang |
| 2003/0065676 A1 | 4/2003 | Gbadegesin et al. |
| 2003/0070091 A1 | 4/2003 | Loveland |
| 2003/0087629 A1 | 5/2003 | Juitt et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2003/0226015 A1 | 12/2003 | Neufled et al. |
| 2003/0233410 A1 | 12/2003 | Gusler |
| 2003/0236983 A1 | 12/2003 | Mihm, Jr. et al. |
| 2004/0001101 A1 | 1/2004 | Trajkovic et al. |
| 2004/0083382 A1 | 4/2004 | Markham et al. |
| 2004/0097217 A1 | 5/2004 | McClain |
| 2004/0100983 A1 | 5/2004 | Suzuki |
| 2004/0121802 A1 | 6/2004 | Kim et al. |
| 2004/0177073 A1 | 9/2004 | Snyder et al. |
| 2004/0209608 A1 | 10/2004 | Kouznetsov et al. |
| 2004/0260710 A1 | 12/2004 | Marston |
| 2005/0154935 A1 | 7/2005 | Jin |
| 2005/0164687 A1 | 7/2005 | DiFazio |
| 2005/0192008 A1 | 9/2005 | Desai et al. |
| 2005/0210270 A1 | 9/2005 | Rohatgi et al. |
| 2005/0213763 A1 | 9/2005 | Owen et al. |
| 2005/0245272 A1 | 11/2005 | Spaur et al. |
| 2006/0059556 A1 | 3/2006 | Royer |
| 2006/0070114 A1 | 3/2006 | Wood et al. |
| 2006/0090136 A1 | 4/2006 | Miller et al. |
| 2006/0120526 A1 | 6/2006 | Boucher et al. |
| 2006/0129848 A1 | 6/2006 | Paksoy et al. |
| 2006/0129948 A1 | 6/2006 | Hamzy et al. |
| 2006/0149846 A1* | 7/2006 | Schuba .................. 709/229 |
| 2006/0156026 A1 | 7/2006 | Utin |
| 2006/0168259 A1 | 7/2006 | Spilotro et al. |
| 2006/0168395 A1 | 7/2006 | Deng et al. |
| 2006/0206931 A1 | 9/2006 | Dillaway et al. |
| 2006/0212589 A1 | 9/2006 | Hayer et al. |
| 2006/0242685 A1 | 10/2006 | Heard et al. |
| 2006/0274750 A1 | 12/2006 | Babbar et al. |
| 2007/0019643 A1 | 1/2007 | Sahheen |
| 2007/0050854 A1 | 3/2007 | Cooperstein et al. |
| 2007/0073694 A1 | 3/2007 | Picault et al. |
| 2007/0156766 A1 | 7/2007 | Hoang et al. |
| 2007/0204153 A1 | 8/2007 | Tome et al. |
| 2007/0204166 A1 | 8/2007 | Tome et al. |
| 2007/0254631 A1 | 11/2007 | Spooner |
| 2007/0277127 A1 | 11/2007 | Carlson et al. |
| 2008/0002726 A1 | 1/2008 | Haung et al. |
| 2008/0028442 A1 | 1/2008 | Kaza et al. |
| 2008/0081609 A1 | 4/2008 | Burgan et al. |
| 2008/0098237 A1 | 4/2008 | Dung et al. |
| 2008/0125146 A1 | 5/2008 | Bainbridge |
| 2008/0130524 A1 | 6/2008 | Volach et al. |
| 2008/0132202 A1 | 6/2008 | Kirkup et al. |
| 2008/0134347 A1 | 6/2008 | Goyal et al. |
| 2008/0137593 A1 | 6/2008 | Laudermilch et al. |
| 2008/0222711 A1 | 9/2008 | Michaelis |
| 2008/0235041 A1 | 9/2008 | Cashdollar et al. |
| 2008/0318616 A1 | 12/2008 | Chipalkatti et al. |
| 2009/0031393 A1 | 1/2009 | Denner |
| 2009/0068996 A1 | 3/2009 | Bakker et al. |
| 2009/0070181 A1 | 3/2009 | Loeffen |
| 2009/0094668 A1 | 4/2009 | Corbin et al. |
| 2009/0178107 A1 | 7/2009 | Karjoth et al. |
| 2009/0181662 A1 | 7/2009 | Fleischman et al. |
| 2009/0254753 A1 | 10/2009 | De Atley et al. |
| 2009/0260052 A1 | 10/2009 | Bathula et al. |
| 2010/0024016 A1 | 1/2010 | Violleau et al. |
| 2010/0024020 A1 | 1/2010 | Baugher et al. |
| 2010/0081417 A1 | 4/2010 | Hickie |
| 2010/0088753 A1 | 4/2010 | Ayres et al. |
| 2010/0107215 A1 | 4/2010 | Bechtel et al. |

(56) References Cited

U.S. PATENT DOCUMENTS

| | | |
|---|---|---|
| 2010/0153969 A1 | 6/2010 | Dyba et al. |
| 2010/0175104 A1 | 7/2010 | Khalid |
| 2010/0184440 A1 | 7/2010 | Mao et al. |
| 2010/0222097 A1 | 9/2010 | Gisby et al. |
| 2010/0242086 A1 | 9/2010 | Adams et al. |
| 2010/0274910 A1 | 10/2010 | Ghanaie-Sichanie et al. |
| 2010/0278162 A1 | 11/2010 | Groux et al. |
| 2010/0281487 A1 | 11/2010 | Schneider et al. |
| 2010/0299376 A1 | 11/2010 | Batchu et al. |
| 2010/0299394 A1 | 11/2010 | Jania et al. |
| 2010/0299719 A1 | 11/2010 | Burks et al. |
| 2010/0319053 A1 | 12/2010 | Gharabally |
| 2010/0325221 A1 | 12/2010 | Cohen et al. |
| 2010/0325430 A1 | 12/2010 | Denninghoff |
| 2010/0325710 A1* | 12/2010 | Etchegoyen ............... 726/7 |
| 2011/0010699 A1 | 1/2011 | Cooper et al. |
| 2011/0082808 A1 | 4/2011 | Beykpour et al. |
| 2011/0099605 A1 | 4/2011 | Cha et al. |
| 2011/0126214 A1 | 5/2011 | O'Farrell et al. |
| 2011/0145833 A1 | 6/2011 | De Los Reyes et al. |
| 2011/0179083 A1* | 7/2011 | Galloway et al. ............. 707/783 |
| 2011/0195698 A1 | 8/2011 | Pearce |
| 2011/0210171 A1 | 9/2011 | Brown et al. |
| 2011/0246753 A1 | 10/2011 | Thomas |
| 2011/0252240 A1 | 10/2011 | Freedman et al. |
| 2011/0270963 A1 | 11/2011 | Saito et al. |
| 2011/0314467 A1 | 12/2011 | Pearson |
| 2012/0005477 A1 | 1/2012 | Wei et al. |
| 2012/0005723 A1 | 1/2012 | Chaturvedi et al. |
| 2012/0023573 A1 | 1/2012 | Shi |
| 2012/0054853 A1 | 3/2012 | Gupta et al. |
| 2012/0079110 A1 | 3/2012 | Brown et al. |
| 2012/0079586 A1 | 3/2012 | Brown et al. |
| 2012/0079609 A1 | 3/2012 | Bender et al. |
| 2012/0109826 A1 | 5/2012 | Kobres |
| 2012/0131685 A1 | 5/2012 | Broch et al. |
| 2012/0144196 A1 | 6/2012 | Owen et al. |
| 2012/0157166 A1 | 6/2012 | Kim et al. |
| 2012/0202527 A1 | 8/2012 | Obradovich et al. |
| 2012/0210443 A1 | 8/2012 | Blaisdell et al. |
| 2012/0214442 A1 | 8/2012 | Crawford et al. |
| 2012/0214503 A1 | 8/2012 | Liu et al. |
| 2012/0278863 A1 | 11/2012 | Wallace et al. |
| 2012/0278904 A1 | 11/2012 | Perez et al. |
| 2012/0291140 A1 | 11/2012 | Robert et al. |
| 2012/0309344 A1 | 12/2012 | Ferrazzini et al. |
| 2012/0324067 A1* | 12/2012 | Hari et al. ............... 709/222 |
| 2013/0074142 A1 | 3/2013 | Brennan et al. |
| 2013/0097657 A1 | 4/2013 | Cardamore et al. |
| 2013/0174222 A1 | 7/2013 | Ogle |
| 2013/0219465 A1 | 8/2013 | Tse et al. |
| 2013/0346606 A1 | 12/2013 | Ryerson et al. |

FOREIGN PATENT DOCUMENTS

| | | |
|---|---|---|
| EP | 605106 | 7/1994 |
| EP | 973350 | 1/2000 |
| EP | 1168141 | 1/2002 |
| EP | 1471691 | 10/2004 |
| EP | 1596410 | 11/2005 |
| EP | 1624428 | 2/2006 |
| EP | 1806674 | 7/2007 |
| EP | 1563663 | 10/2008 |
| EP | 2337300 | 6/2011 |
| GB | 2378780 | 2/2003 |
| GB | 2408179 | 5/2005 |
| GB | 2440015 | 1/2008 |
| JP | 2000-253241 | 9/2000 |
| JP | 2001-077811 | 3/2001 |
| JP | 2001-203761 | 7/2001 |
| JP | 2002-288087 | 10/2002 |
| WO | 96/25828 | 8/1996 |
| WO | 99/05814 | 2/1999 |
| WO | 00/59225 | 10/2000 |
| WO | 00/60434 | 10/2000 |
| WO | 2004017592 | 2/2004 |
| WO | 2004043031 | 5/2004 |
| WO | 2005045550 | 5/2005 |
| WO | 2006/130807 | 12/2006 |
| WO | 2007048251 | 5/2007 |
| WO | 2009/012329 | 1/2009 |
| WO | 2009014975 | 1/2009 |
| WO | 2012109497 | 1/2009 |
| WO | 2009021200 | 2/2009 |
| WO | 2012037656 | 3/2012 |
| WO | 2012037657 | 3/2012 |
| WO | 2012037658 | 3/2012 |

OTHER PUBLICATIONS

Research in Motion, "BlackBerry Device Service 6.1 and BlackBerry PlayBook Tablet 2.1, Security Technical Overview"; Version: 6.1; Sep. 17, 2012; 90 pages.

Office Action issued in U.S. Appl. No. 10/524,353 on Sep. 21, 2012; 16 pages.

Office Action issued in U.S. Appl. No. 13/098,456 on Sep. 13, 2012; 20 pages.

International Search Report and Written Opinion issued in International Application No. PCT/CA2011/001058 on Dec. 21, 2011; 9 pages.

XP002167366, Chen, Zhigun; "Java Card Technology for Smart Cards: Architecture and Programmer's Guide"; "Applet Firewall and Object Sharing," Internet citation; Jun. 2, 2000; <http://developer.java.sun.com/developer/Books/consumerproducts/javacard/ch09.pdf>.

Ferguson et al., U.S. Appl. No. 13/293,743, "Managing Cross Perimeter Access," filed Nov. 10, 2011.

Office Action issued in U.S. Appl. No. 13/398,676 on Sep. 5, 2012; 21 pages.

Extended European Search Report issued in European Application No. 11188696.6 on Apr. 12, 2012; 7 pages.

Extended European Search Report issued in European Application No. 11186802.2 on Jan. 18, 2012; 7 pages.

Microsoft Office: Microsoft Outlook 2010 Product Guide; Microsoft Corp. published in 2010; 65 pages.

Windows 7 Product Guide; Microsoft Corp. published in 2009; 140 pages.

Extended European Search Report issued in European Application No. 12173030.3 on Nov. 22, 2012; 6 pages.

Extended European Search Report issued in European Application No. 11186796.6 on Jan. 18, 2012; 8 pages.

Extended European Search Report issued in European Application No. 12189773.0 on Mar. 7, 2013; 8 pages.

International Search Report and Written Opinion of the International Searching Authority issued in International Application No. PCT/CA2012/050796 on Feb. 21, 2013; 13 pages.

Google Inc.; Android 2.3.4 User's Guide; May 20, 2011; 384 pages.

Microsoft Corp.; Microsoft Outlook 2010; Released Jul. 15, 2010; 27 pages.

Office Action issued in U.S. Appl. No. 13/293,743 on Feb. 14, 2013; 15 pages.

Office Action issued in U.S. Appl. No. 13/274,913 on Jan. 23, 2013; 22 pages.

International Search Report and Written Opinion issued in International Application No. PCT/CA2012/050797 on Feb. 5, 2013; 8 pages.

Office Action issued in U.S. Appl. No. 13/529,509 on Mar. 25, 2014.

International Preliminary Report on Patentability under Ch. II issued in International Application No. PCT/CA2012/050796 on Mar. 10, 2014; 18 pages.

IETF RFC 3530; "Network File System (NFS) Version 4 Protocol"; Apr. 2003.

"Secure Inter-Process Communication"; Apr. 4, 2004. Retrieved from internet on Jan. 20, 2014 https://web.archive.org/web/20040404015137/http://cr.yp.to/docs/secureipc.html.

Notice of Allowance issued in Canadian Application No. 2,769,646 on Feb. 15, 2013; 1 page.

(56) References Cited

OTHER PUBLICATIONS

Examiner's First Report issued in Australian Application No. 2012203391 on Jan. 22, 2014; 4 pages.
Advisory Action issued in U.S. Appl. No. 13/293,743 on Nov. 26, 2013; 3 pages.
Advisory Action issued in U.S. Appl. No. 13/275,097 on Dec. 6, 2013; 4 pages.
Office Action issued in U.S. Appl. No. 13/722,213 on Dec. 4, 2013; 6 pages.
Notice of Allowance issued in U.S. Appl. No. 13/722,213 on Jan. 29,2014; 7 pages.
View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.
Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5 . . . , pp. 1-6, retrieved on Feb. 12, 2010.
EP Application No. 12155659.1, Extended European Search Report dated Jan. 8, 2012.
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Extended European Search Report mailed Jul. 13, 2012, in corresponding European patent application No. 12153439.0.
"Customizing User Interaction in Smart Phones", Pervasive Computing, IEEE CS (2006) pp. 81-90 (URL: http://www.idi.ntnu.no/grupperlsu/bibliography/pdf/2006/Korpipaa2006pc.pdf).
"Supporting Mobile Privacy and Security through Sensor-Based Context Detection"", Julian Seifert, Second International Workshop on Security and Privacy in Spontaneous Interaction and Mobile Phone Use, May 17, 2010, Finland (U RL: http://www.medien.ifi.lmu.de/iwssi201 0/papers/iwssi-spmu201 O-seifert.pdf)".
EagleVision: A Pervasive Mobile Device Protection System, Ka Yang, Nalin Subramanian, Daji Qiao, and Wen sheng Zhang, Iowa State Unviersity (URL: http://www.cs.iastate.edu/-wzhang/papers/eagleVision.pdf) Jul. 13-16, 2009.
"Using context-profiling to aid access control decisions in mobile devices"", Gupta et al., Nokia Research Center (URL: http://www.cerias.purdue.edu/assets/symposium/2011-posters1372-C48.pdf) Please refer to the I-page file named 372-C48.pdf"; 2011.
Owen, Russell N., U.S. Appl. No. 10/524,353, filed Feb 14, 2005; Title: System and Method for Secure Control of Resources of Wireless Mobile Communication Device.
International Application No. PCT/CA 03101245, International Search Report dated Dec. 23, 2003.
International Application No. PCT/CA 03101245, PCT Written Opinion, dated Apr. 23, 2004.
International Application No. PCT/CA 03101245, PCT Written Opinion, dated Sep. 20, 2004.
International Application No. PCT/CA 03101245, PCT International Preliminary Examination Report, dated Nov. 29, 2004.
"Owen, Russell N., U.S. Appl. No. 13/371,093, filed Feb. 10, 2012; Title: System and Method for Secure Control of Resources of Wireless Mobile Communication Devices Secure Control of Resources of Wireless Mobile Communication Device;".
Int'l Search Report and the Written Opinion of the Int'l Searching Authority, or the Declaration of Appln. Serial No. PCT/CA2004/000250 of Feb. 20, 2004—12 pgs.
Int'l Search Report or the Declaration of Appln. Serial No. PCT/CA03/01679 of Oct. 31, 2003—6 pgs.
Red Hat: "Red Hat Linux 7.2—The Official Red Had Linux Reference Guide" Red Hat Linux Manuals, Online!, Oct. 22, 2001, XP002276029, pp. 145-155.
Sygate: "Sygate Personal Firewall PRO User Guide" Sygate Personal Firewall Pro User Guide version 2.0 2001, pp. 1-77, XP002248366.
Bender, Christopher Lyle; U.S. Appl. No. 13/074,136, filed Mar. 29, 2011; Title: Data Source Based Application Sandboxing.
"A Technical Overview of the Lucent VPN Firewall" White Paper Lucent Technologies, XX, XX, Aug. 2002, pp. 1-35, XP002271173, Chapter 1.
European Search Report of Appln. No. 04256690.1-2412, date of mailing Apr. 6, 2005—9 pgs.
Fourth Office Action. Chinese Application No. 200380105435.2. Dated: Aug. 3, 2011.
Patent Certificate. Indian Patent Application No. 1956/DELNP/2005. Dated: Oct. 31, 2003.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Notice of Allowance. Canadian Application No. 2,505,343. Dated: Sep. 15, 2009.
Extended European Search Report issued in European Application No. 12189805.0 on Apr. 16, 2013; 6 pages.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.
Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
Office Action issued in Canadian Application No. 2,564,914 on May 3, 2010; 4 pages.
Office Action issued in Canadian Application No. 2,564,914 on Apr. 4, 2011; 2 pages.
First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.

(56) References Cited

OTHER PUBLICATIONS

Communication Pursuant to Article 94(3) EPC issued in European Application No. 05738877.9 on Jul. 15, 2009; 4 pages.
Communication under Rule 71(3) EPC issued in European Application No. 05738877.9 on Sep. 17, 2010; 41 pages.
First Examination Report issued in Indian Application No. 6068/DELNP/2006 on Jun. 3, 2010; 2 pages.
Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
Office Action issued in U.S. Appl. No. 13/722,213 on May 22, 2013; 8 pages.
Office Action issued in Canadian Application No. 2,769,646 on Jun. 5, 2012; 3 pages.
Office Action issued in Canadian Application No. 2,769,646 on Oct. 22, 2012; 2 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
Notice of Allowance issued in U.S. Appl. No. 13/490,956 on Dec. 4, 2013; 8 pages.
Office Action issued in U.S. Appl. No. 13/296,963 on Nov. 18, 2013; 23 pages.
Office Action issued in U.S. Appl. No. 13/293,743 on Sep. 20, 2013; 19 pages.
Notice of Allowance issued in U.S. Appl. No. 13/398,676 on Nov. 7, 2013; 22 pages.
Office Action issued in U.S. Appl. No. 13/274,913 on Jul. 16, 2013.
Office Action issued in U.S. Appl. No. 13/274,913 on Jan. 2, 2014.
Office Action issued in U.S. Appl. No. 13/659,527 on May 23, 2013; 8 pages.
Notice of Allowance issued in U.S. Appl. No. 13/659,527 on Oct. 7, 2013; 15 pages.
Office Action issued in U.S. Appl. No. 13/098,456 on Apr. 17, 2013; 31 pages.
Office Action issued in U.S. Appl. No. 13/098,456 on Sep. 27, 2013; 28 pages.
Communication Pursuant to Article 94(3) EPC issued in European Application No. 11188696.6 on Jul. 9, 2013; 4 pages.
Office Action issued in Canadian Application No. 2,564,914 on Dec. 3, 2013; 2 pages.
Office Action issued in Chinese Application No. 201110308441.4 on Oct. 25, 2013; 9 pages.
International Preliminary Report on Patentability under Chapter II issued in International Application No. PCT/CA2012/050797 on Feb. 12, 2014; 13 pages.
Communication Pursuant to Article 94(3) EPC issued in European Application No. 11186796.6 on Aug. 29, 2014; 5 pages.
Office Action issued in Canadian Application No. 2,792,772 on Sep. 5, 2014; 3 pages.
Office Action issued in Canadian Application No. 2,792,707 on Sep. 8, 2014; 3 pages.
Office Action issued in U.S. Appl. No. 13/296,963 on Oct. 3, 2014.
Notice of Allowance issued in Austrailian Application No. 2012203391 on Jul. 25, 2014; 2 pages.
Communication pursuant to Article 94(3) issued in EP Application No. 11186802.2 on Aug. 25, 2014.
Office Action issued in U.S. Appl. No. 13/293,743 on Jul. 16, 2014.
Office Action issued in U.S. Appl. No. 13/274,913 on Jul. 1, 2014.
Office Action issued in U.S. Appl. No. 13/25,097 on Jul. 16, 2014.
Office Action issued in U.S. Appl. No. 13/659,561 on Jul. 2, 2014.
Extended European Search Report mailed Mar. 17, 2014 in European Application No. 11162178.5.
Office Action issued in Chinese Application No. 201110308441.4 on Jul. 8, 2014; 4 pages.
Office Action issued in U.S. Appl. No. 13/274,913 on Dec. 5, 2014.
Office Action issued in Canadian Application No. 2,820,687 on Nov. 3, 2014; 3 pages.
Office Action issued in U.S. Appl. No. 13/659,561 on Dec. 10, 2014.

* cited by examiner

ASSOCIATING SERVICES TO PERIMETERS

TECHNICAL FIELD

This disclosure relates to associating services to perimeters.

BACKGROUND

In many instances, computational devices may include data, applications, or network resources whose accessibility is controlled by security protocols. As examples, the security protocols may include user accounts, administration rights, password protection, database management, and others. Though, resources associated with different enterprises and users may require different secured accessibility.

DESCRIPTION OF DRAWINGS

Like reference symbols in the various drawings indicate like elements.

DETAILED DESCRIPTION

The present disclosure is directed to a system and method for enabling access to resources in an enterprise perimeter when accessing services by connecting to a network through a wireless connection with another device. For example, a tablet computer, when connecting to a network through a wireless connection with another device, may access resources in an enterprise perimeter based on an enterprise identifier assigned to the tablet computer and the connecting device. A perimeter may generally refer to a logical separation of resources such as applications, stored data and network access. Resources included in a perimeter may be encrypted and password protected to securely separate those resources from resources in different perimeters. For example, resources in different perimeters may be prohibited from transferring data. In some implementations, perimeters may include personal perimeters and enterprise perimeters (or corporate perimeters). A personal perimeter may generally refer to a perimeter created by default for a user and managed by the same An enterprise perimeter may generally refer to a perimeter created for or by a user and managed by a remote management server or service (e.g., a BlackBerry Enterprise Server (BES) or a BlackBerry Playbook Administration Service (BPAS), etc.).

When connecting to a network through a wireless connection with another device, a wireless communication device (e.g., tablet computer) may access enterprise resources using tethering techniques, such as a connecting device, with another device. Tethering can happen, for example, when the connecting device is a cellular phone (e.g., BlackBerry smartphone), which has both cellular services and wireless local area network (WLAN) services (e.g., Wi-Fi services) enabled, while the wireless communication device (e.g., tablet computer) has WLAN services but not cellular services. The cellular phone may access, through a cellular network, enterprise resources that is associated with an enterprise perimeter included in the wireless communication device. The cellular phone may perform tethering to the wireless communication device through a direct wireless connection (e.g., Wi-Fi, Bluetooth). In some implementations, a user can access, when tethering, resources included in an enterprise perimeter to access services in an enterprise network. Alternatively or in addition, the wireless communication device may directly access enterprise resources. Regardless, the wireless communication device may compare an assigned enterprise identifier with an enterprise identifier assigned to the connecting device and grant access to resources in the enterprise in response to the identifiers matching.

Figure 1:
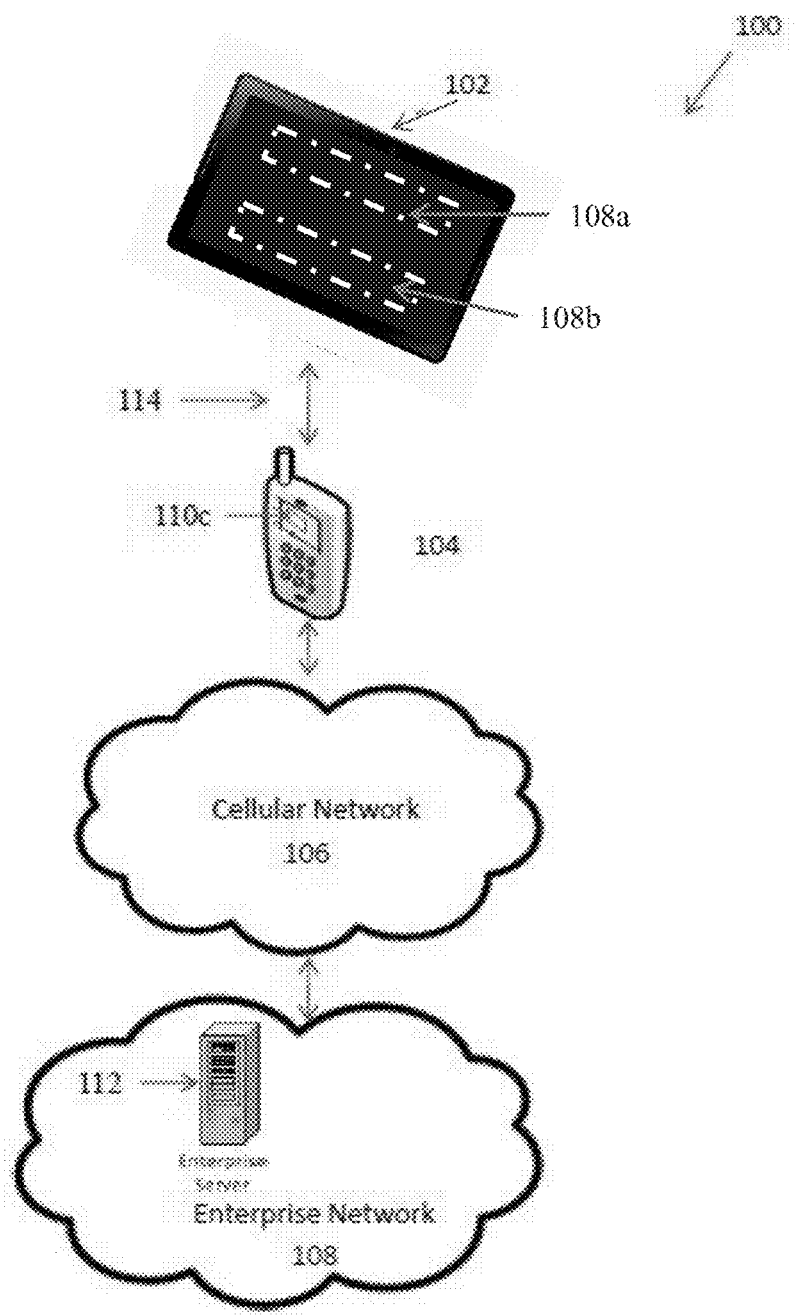
FIG. 1 is an example communication system environment for granting access to resources while connecting to a network through a wireless connection with another device.

FIG. 1 is an example system 100 for granting access to resources of an enterprise perimeter of a wireless communication device (e.g., tablet computer) when connecting to a network through a wireless connection with another device. For example, the system 100 may identify enterprise identifiers assigned to each device by an enterprise and grant access to resources in an enterprise perimeter if the identifiers match. An enterprise identifier can include an email address, an employee number, a client certificate, a cryptographic token, a server name, or other character strings. In some implementations, the system 100 may execute one or more of the following: transmit to an enterprise a request to access a server resource account; receive an indication that access has been granted and identifies an enterprise identifier assigned to the device; generate an enterprise perimeter including the enterprise identifier and resources for accessing the server resource account; receive a request to connect the current device to a network using another device; in connection with connecting with the devices, identifying an enterprise identifier assigned to the connecting device; receiving a request to access a resource in an enterprise perimeter of the current device; comparing the enterprise identifier of the current device to that of the connecting device; granting access to the resource in response to the identifiers matching; generating a separate unknown user perimeter in response to the identifiers not matching; or other processes. By assigning enterprise identifiers to device and connecting with another device with the same enterprise identifier, the system 100 may grant access to resources to an existing enterprise network when connecting to the enterprise network through a wireless connection with another device.

At a high-level description of the elements, the system 100 includes a first user device 102 communicably coupled to a second user device 104. The second user device 104 is communicably coupled to the cellular network 106 and the enterprise network 108. The first user device 102 includes perimeters 110a and 110b configured to prevent access to included resources, and the second user device 104 includes perimeter 110c configured to prevent access to included resources. The enterprise network 108 includes an enterprise server 112 for providing access to server resource accounts. As for a high level description of operation, the device 102 may wirelessly transmit a request to connect to a network using the device 104. The device 104 may verify the user and transmit information indicating that the connecting request is granted. The transmitted information may include an enterprise identifier. While connected to network through the device 104, the device 102 may receive a request to access a resource in an enterprise perimeter 110. In response to at least the request, the device 102 may compare the enterprise identifier of the device 102 to the enterprise identifier of the device 104. In the event that the identifiers match, the device 102 may grant access to the resource in the enterprise perimeter 110. In the event that the identifiers do not match, the device 110 may generate a separate unknown user perimeter 110 including resources for accessing an account from the enterprise server 112. In some implementations, when connecting to a network through a wireless connection with another device, the device 102 may be granted network connectivity to the Internet, network connectivity to the (enterprise) intranet, access personal or enterprise data on the device 110, or other access.

Turning to a more detailed description of the elements, the devices 102 and 104 may be any local or remote computing device operable to receive requests from the user via a user interface, such as a Graphical User Interface (GUI), a CLI (Command Line Interface), or any of numerous other user interfaces. Thus, where reference is made to a particular interface, it should be understood that any other user interface may be substituted in its place. In various implementations, the devices 102 and 104 may comprises electronic computing devices operable to receive, transmit, process and store any appropriate data associated with the communication system 100. As used in this disclosure, the devices 102 and 104 are intended to encompass any electronic device or computing device that has wireless communication capability. For example, the devices 102 and 104 may be a tablet computer, a personal computer, a laptop computer, touch screen terminal, workstation, network computer, kiosk, wireless data port, wireless or wireline phone, personal data assistant (PDA), smartphone, at least one processor within these or other devices, or any other suitable processing device. For example, the devices 102 and 104 may comprise wireless communication devices that include an input device, such as a keypad, touch screen, mouse, or other device that can accept information, and an output device that conveys information associated with the operation of the resources, including digital data, visual information, or GUI. The devices 102 and 104 may include fixed or removable storage media such as a magnetic computer disk, CD-ROM, flash memory, or other suitable media to both receive input from and provide output to users through the display, such as a GUI. In addition, the devices 102 and 104 may include less or more perimeters 110 as compared with the illustrated perimeters 110.

In some implementations, the device 102 and the device 104 may wirelessly communicate using Bluetooth, Wi-Fi, WiMAX, or other wireless communication protocols. The device 104 may wirelessly communicate with the cellular network 106. In these instances, the device 104 may be any wireless communication device that includes cellular network communication capability, i.e., comprises a cellular device 104. For example, the device 104 may be a 2nd generation (2G), a 3rd generation (3G), or a 4th generation (4G) telecommunication device. Example 2G, 3G and 4G telecommunication network standards include Global System for Mobile communication (GSM), Interim Standard 95 (IS-95), Universal Mobile Telecommunications System (UMTS), CDMA2000 (Code Division Multiple Access), 3GPP long-term evolution (LTE), LTE-Advanced (LTE-A), and others. In these instances, the wireless communication device 102 may communicate with the cellular device 104 through a wireless connection 114. For example, the cellular device 104 may be a connecting device, and information communicated between the wireless communication device 102 and the enterprise server 112 may be tethered by the cellular device 104.

In some implementations, the wireless communication device 102 may access the enterprise server 112 based on tethering via the cellular device 104. For example, when the wireless communication 102 does not have cellular network access functionality, and the enterprise server 112 is not communicably coupled to the cellular network 106, the wireless communication device 102 may not be able to communicate directly with the enterprise server 112. In such case, if the cellular device 104 (e.g., a BlackBerry smart phone) includes tethering functionality and can perform cellular network communications with the enterprise server 112, the cellular device 104 may then be used as a connecting device (or a relay) to enable communication between the wireless communication device 102 and the enterprise server 112. The wireless communication device 102 and the cellular device 104 may communicate using a direct wireless connection (e.g., Bluetooth, Infrared, optical connection, WiFi, WiMax, RFID, NFC, etc.), a wired connection (e.g, USB, Firewire, etc.), or personal or local area networks. The cellular device 104 may have access to an enterprise account maintained on the enterprise server 112. The cellular device 104 may also have an enterprise perimeter 110c associated with the enterprise account generated locally on the cellular device 104. When tethering, a user of the device 102 may access the enterprise account. In some implementations, the device 102 may grant access to resources an enterprise perimeter 110 when connecting to a network through the device 104. For example, the device 102 may request an enterprise identifier from the device 104 and determine whether the enterprise identifier matches the enterprise identifier of the device 102. In the case of a match, the device 102 grants access to the resources when connecting to a network through the device 104. If there is not match, the device 102 generates a separate unknown user perimeter including resources for accessing the account.

The devices 102 and 104 also include perimeters 110 configured to prevent access to internal resources. The perimeter 110 may include password protection, encryption, and other process for controlling access to resources assigned to the perimeter or internal resources. Resources may include at least one of data, network access, applications, configurations, policies, or others. In some implementations, the perimeters 110a-c may be enterprise perimeters created by an administrator for an enterprise and may be managed by the remote management server 112. As described previously, the enterprise account may be, for example, an account that pushes data to the device 102 (e.g., ActiveSync). When the wireless communication device 102 accesses the account, the perimeter 110 may include policies identifying one or more security settings for the enterprise account. These policies may be maintained and enforced by an enterprise server (not shown) residing in an enterprise network (or corporate network) 104a. in some implementations, the perimeters 110 may include at least one of data, network access, applications, configurations, or policies 120.

In some implementations, the cellular network 106 is provides connectivity with other wireless communication systems and wired communication systems. The wireless communication system may communicate with wireless device 104 using a wireless technology such as one based on orthogonal frequency division multiplexing (OFDM), Orthogonal Frequency Division Multiple Access (OFDMA), Single Carrier Frequency Division Multiple Access (SC-FDMA), Discrete Fourier Transform Spread Orthogonal Frequency Division Multiplexing (DFT-SOFDM), Space-Division Multiplexing (SDM), Frequency-Division Multiplexing (FDM), Time-Division Multiplexing (TDM), Code Division Multiplexing (CDM), or others. The wireless communication system may transmit information using Medium Access Control (MAC) and Physical (PHY) layers. The techniques and systems described herein may be implemented in various wireless communication systems such as a system based on Long Term Evolution (LTE), LTE-Advanced (LTE-A), Global System for Mobile Communication (GSM) protocols, Code Division Multiple Access (CDMA) protocols, Universal Mobile Telecommunications System (UMTS), Unlicensed Mobile Access (UMA), or others. The cellular network 106 may include one or more base station for wirelessly communicating with the device 104. In addition, the cellular network 106 may be connected to the enterprise network 108.

The enterprise network 108 is a network associated with an enterprise. The enterprise may comprise a corporate or business entity, a government body, a non-profit institution, or any other organization coupled to the devices 102 and 104. In some implementations, the enterprise may be the owner of devices 102 or 104. In some implementations, the device 102 or 104 may be owned the user, and, in these cases, the user may an enterprise to configure an enterprise perimeter 110 on the personal device 102. Of course, the enterprise may also lease the devices 102 or 104 or may hire contractors or agents who are responsible for maintaining, configuring, controlling, and/or managing the devices 102 and 104. In the illustrated implementation, the network 108 facilitates communication with the devices 102 and 104. The network 108 may communicate, for example, Internet Protocol (IP) packets, Frame Relay frames, Asynchronous Transfer Mode (ATM) cells, voice, video, data, and other suitable information between network addresses. In addition, while the enterprise network 108 is illustrated as a single network, the network 108 may comprise a plurality of networks. In short, the enterprise network 108 is any suitable network that configured to communicate with the device 104. In the illustrated implementation, the enterprise network 108 includes the enterprise server 112.

The enterprise server 112 may include any software, hardware, firmware, or a combination thereof configured to manage access to one or more server resource accounts. The enterprise account may be, for example, an ActiveSync email, calendar, or contacts account. The enterprise account may be associated with an enterprise perimeter 110 such that the perimeter 110 may secure applications, data, and security policies for accessing the account. The enterprise server 112 may maintain or enforce resources, settings, and security policies associated with the enterprise perimeter 110 and accounts. The enterprise server 112 may receive a request associated with the enterprise account and initiate generation of a perimeter 110 in connection with providing access to the account. In some implementations, the enterprise server 112 may transmit information indicating security policies for accessing a server resource account. As previously mentioned, the enterprise server 112 may also assign an enterprise identifier to a device in connection with granting access to a server user account. For example, the enterprise server 112 may transmit the enterprise identifier in connection with transmitting the security policies to the device 102 or 104. The enterprise identifier may include a network address, an employee number, or other character strings.

Figure 2:
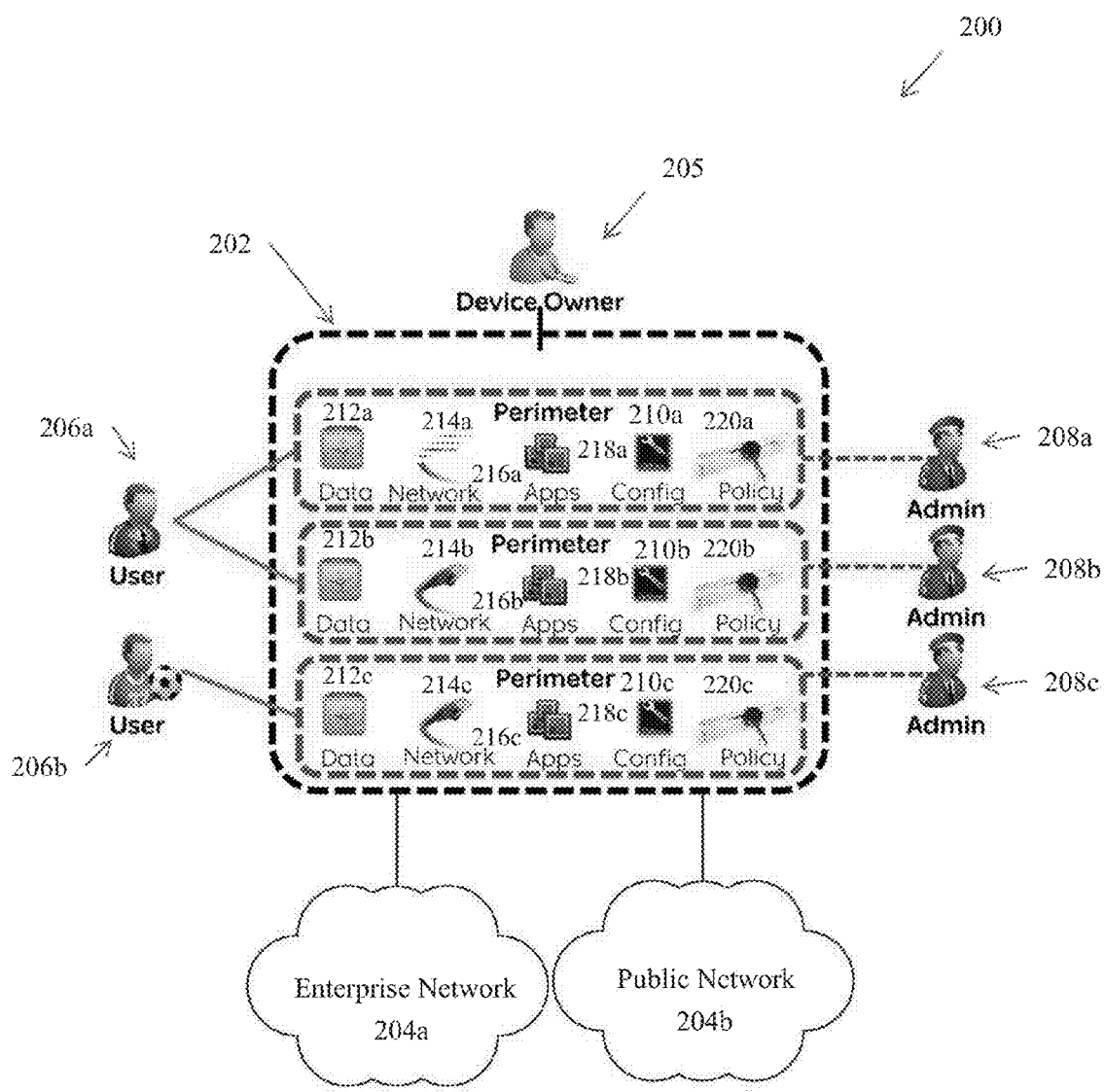
FIG. 2 is an example device of FIG. 1 associated with granting access to resources while connecting to a network through a wireless connection with another device.

FIG. 2 is a communication system 200 including an example device 202. The example device 202 comprises an example implementation for device 102 and 104. As illustrated, the communication system 200 includes the device 202 communicably coupled to networks 204a and 204b (individually and collectively referred to as 204). In addition, the device 202 may interact with a device owner 205, one or more users 206a and 206b (individually and collectively referred to as 206), one or more administrators 208a-c (individually and collectively referred to as 208), a combination of the foregoing, or others. The wireless communication device 202 includes perimeters 210a-c, and each perimeter includes data 212, network access resource 214 for providing access to networks, applications 216 for providing services to users 206, configuration files 218 for configuring resources, and policies 220 for defining policies for accessing enterprise accounts. As for a high-level description of operation, the device 202 receives a request to access resources for accessing an enterprise account in the enterprise network 204a when connecting to a network through a wireless connection with another device. In response to the request, the device 202 determines whether the enterprise identifier assigned to the device 202 matches the connecting device. If matching, the device grants access to the resources in the perimeter 210. Otherwise, the device 202 generates a separate unknown user perimeter for accessing the account.

The device 202 includes the perimeters 210a-c configure to prohibit access to internal resources by external resources. In some implementations, the perimeter 210 may include password protection, encryption, and other process for controlling access to resources assigned to the perimeter or internal resources. A perimeter 210 may be generated by the device owner 205, a user 206, an administrator 208, or others. In some examples, the perimeter 210a may be a personal perimeter created by default for the user 206a and managed by the user 206a. In some examples, the perimeter 210a may be an enterprise perimeter created by an administrator 208a for an enterprise and may be managed by a remote management server. In some implementations, each personal perimeter 210 may be associated with a personal account, and each enterprise perimeter 210 may be associated with an enterprise account. In addition, a given perimeter 210 may be accessed by the device owner 204, a user 206, an administrator 208, a combination of the foregoing, or others. In some implementations, each perimeter 210 may be associated with a single user 206 while each user 206 may access multiple device perimeters 210. For example, the user 206a may access resources within both the perimeter 210a and the perimeter 210b. The user 206b may have access to resources in only one perimeter 210c. The device owner 205 may have the ability to remove individual perimeters 210 from the wireless communication device 202. In some implementations, the user 206 may set up or log in to an enterprise account via a user interface. As described previously, the enterprise account may be an account that pushes data to the device 202 (e.g., ActiveSync). When the wireless communication device 202 accesses the account, the perimeter 210 may include policies identifying one or more security settings for the enterprise account. These policies may be maintained and enforced by an enterprise server (not shown) residing in an enterprise network (or corporate network) 204a. While the perimeters 210 are illustrated as including all aforementioned resources such as data 212, one or more network access resources 214, one or more applications 216, one or more configuration files 218, and one or more policies 220, the perimeters 210 may include some, all or different resources without departing from the scope of the disclosure.

In the illustrated implementation, a given perimeter 210 may include data 212, network access resource 214, applications 216, configuration files 218, a policy 220, a combination of the foregoing, or other resources. The data 212 may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the wireless communication device 202 and its applications 216. Additionally, the data 212 may include any other appropriate data, such as data associated with VPN applications, firmware logs and policies, firewall policies, a security or access log, print or other reporting files, as well as others. The data 212 may be stored in any memory or database module and may take the form of volatile or non-volatile memory including, without limitation, magnetic media, optical media, random access memory (RAM), read-only memory (ROM), removable media, or any other suitable local or remote memory component.

The network access resource 214 may include any parameters, variables, policies, algorithms, instructions, settings, or rules for granting access to the network 204a or 204b or other network. For example, the network access resource 214 may include or identify firewall policies for accessing the enterprise network 204a. In some implementations, the network access resources 214 include or otherwise identify one or more of the following: a username; a password; a security token; a Virtual Private Network (VPN) configuration; firewall policies; a communication protocol; encryption key certificates, or others.

The applications 216 may comprise any application, program, module, process, or other software that may execute, change, delete, generate, or otherwise manage business information according to the present disclosure. In certain cases, the communication system 200 may implement a composite application 216. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the wireless communication device 202, one or more processes associated with the application 216 may be stored, referenced, or executed remotely. For example, a portion of the application 216 may be an interface to a web service that is remotely executed. Moreover, the application 216 may be a child or sub-module of another software module or enterprise application (not illustrated) without departing from the scope of this disclosure. In some implementations, the application 216 may be a hosted solution that allows multiple parties in different portions of the process to perform the respective processing. For example, the enterprise network 202 may access the application 216 on the wireless communication device 202 or even as a hosted application located over network 202b without departing from the scope of this disclosure. In another example, portions of the application 216 may be used by the user 206 working directly at the wireless communication device 202, as well as remotely via enterprise network 202a. In some implementations, the applications 216 may be configured to access at least one of a personal perimeter 210 or an enterprise perimeter 210, which may be referred to as dual mode applications or hybrid mode applications. A dual mode application 216 may access either a personal perimeter 210 or an enterprise perimeter 210. A hybrid mode application 216 may access both a personal perimeter 210 and an enterprise perimeter 210.

The configuration file 218 may include any parameters, variables, policies, algorithms, instructions, settings, or rules for configuring software of the wireless communication device 202. For example, the configuration file 218 may include a table that identifies settings for one or more applications 216. In some implementations, the configuration file 218 identifies initial settings for one or more applications 216. In addition to user applications 216, the configuration file 218 may identify settings for other types of applications such as operating system settings. The files 218 may be written in ASCII and line-oriented, with lines terminated by a newline or carriage return/line feed pair, depending on the operating system.

The policy 220 may include any parameters, variables, policies, algorithms, instructions, settings, or rules for accessing accounts. For example, the policy 220a may identify one or more accounts external in the network 204 and information for accessing the accounts. For example, the policy 220 may include a password, an encryption algorithm and key, and access rules. In some implementations, the policy 220 may include or otherwise identify one or more of the following: a password; an encryption key; access rules; a specific account; a network address; internal resources; a user; an owner; an administrator; a time period; or other information. With regard to external accounts, the policy 220 may identify a specific account and associated rules or information for accessing the external account. In some implementations, a policy 220 may define or otherwise identify a process for user authentication prior to enabling access to an account. For example, the policy 220 may identify the type and content of user authentication (e.g., password strength, lifecycle) to apply to an account-access request.

The wireless communication device 202 may be connected to multiple networks, such as the enterprise network 204a and the public network 204b. The enterprise network 204a is a network associated with an enterprise. The enterprise may comprise a corporate or business entity, a government body, a non-profit institution, or any other organization connected to the wireless communication device 202. The enterprise may be the owner 204 of the wireless communication device 202. Of course, the enterprise may also lease the wireless communication device 202 or may hire contractors or agents who are responsible for maintaining, configuring, controlling, and/or managing the wireless communication device 202. In the illustrated implementation, the networks 204 facilitate wireless and/or wireline communication with the wireless communication device 202. The networks 204 may communicate, for example, Internet Protocol (IP) packets, Frame Relay frames, Asynchronous Transfer Mode (ATM) cells, voice, video, data, and other suitable information between network addresses. In addition, while the enterprise network 204a and the public network 204b are each illustrated as a single network, each network 202 may comprise a plurality of networks. In short, the enterprise network 204a and the public network 204b are any suitable network that configured to communicate with the device 204.

Figure 3A:
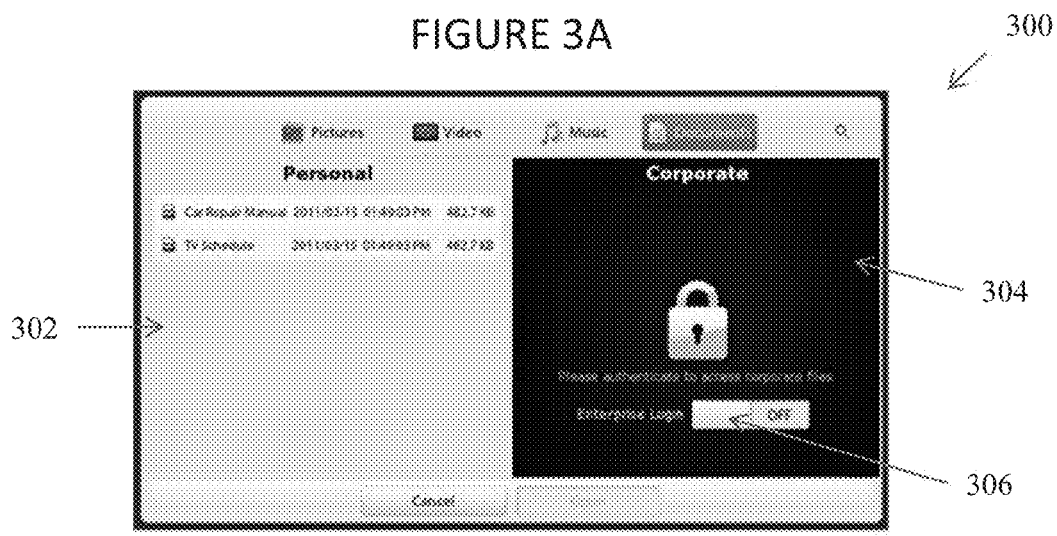
FIGS. 3A-C are example displays illustrating an example process for accessing an enterprise perimeter.

FIG. 3A is an example screen 300 for accessing resources in an enterprise perimeter using a GUI. The GUI may be presented on a touchscreen display 300 of a wireless communication device (e.g., a BlackBerry Playbook tablet PC), as described with regard to FIG. 2. As shown in the first screen 300 of the example GUI, the left hand side of the GUI displays content included in a personal perimeter 302. The personal perimeter 302 may be a default perimeter of the wireless communication device, as described with regard to FIG. 2. Since the personal perimeter 302 may be a default perimeter, a user of the wireless communication device may have the permission to access and manipulate the documents under the personal perimeter 302. The right hand side of the GUI displays information associated with an enterprise perimeter (or a corporate perimeter) 304. As indicated, the user has not logged in to its enterprise account and verified enterprise identifiers with the connecting device. Thus, the corporate screen associated with the enterprise perimeter 304 is locked. The user may slide or click the scroll bar 306 to trigger a password authentication process.

Figure 3B:
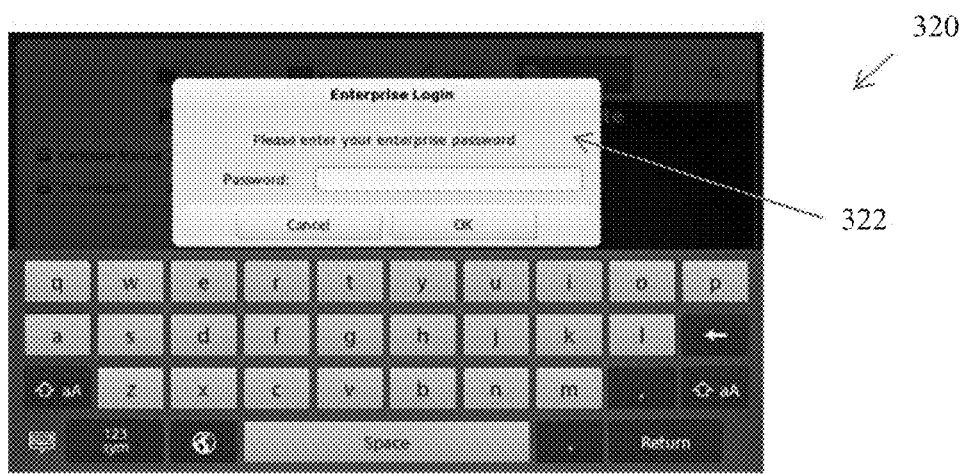

FIG. 3B is a second screen 320 of the example GUI. In this implementation, the screen 320 shows a pop-up window 322 prompting to receive the password to log in to the enterprise account. The account settings may accordingly be added to the wireless communication device. As described with regard to FIG. 2, log in to the enterprise account or adding the enterprise account to the wireless communication device may create a new record at the password manager on an enterprise server, which may trigger an event for the enterprise server to "push down" settings/policies to the wireless communication device. Upon authenticating the password, the wireless communication device may determine whether access to the resources is granted by determining whether the enterprise identifiers of the current device match the connecting device.

Figure 3C:
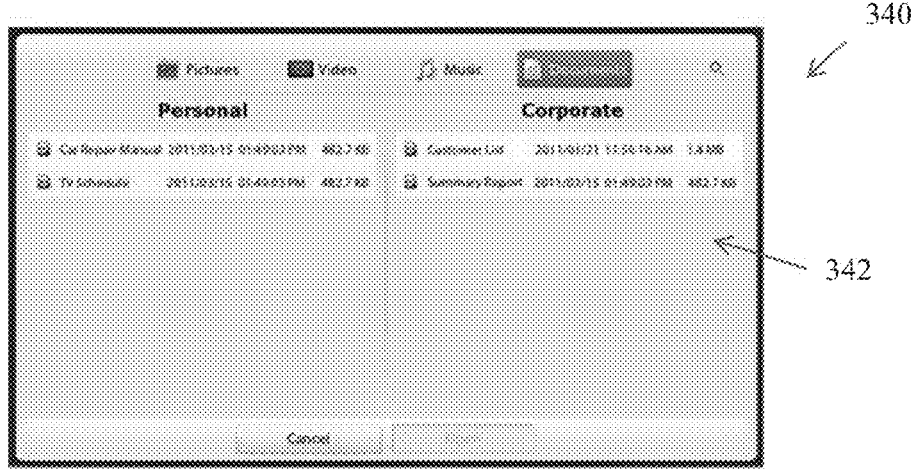

FIG. 3C is a third screen 340 of the example GUI. In these implementations, the personal perimeter 302 and the enterprise perimeter 342 are displayed separately. The documents included in the personal perimeter 302 and the enterprise perimeter 304 are logically separated from each other and stored in the wireless communication device. The user may not be permitted to transfer documents between the personal perimeter 302 and the enterprise perimeter 342. As such, the corporate data included in the enterprise perimeter 342 may be secured.

Figure 4:
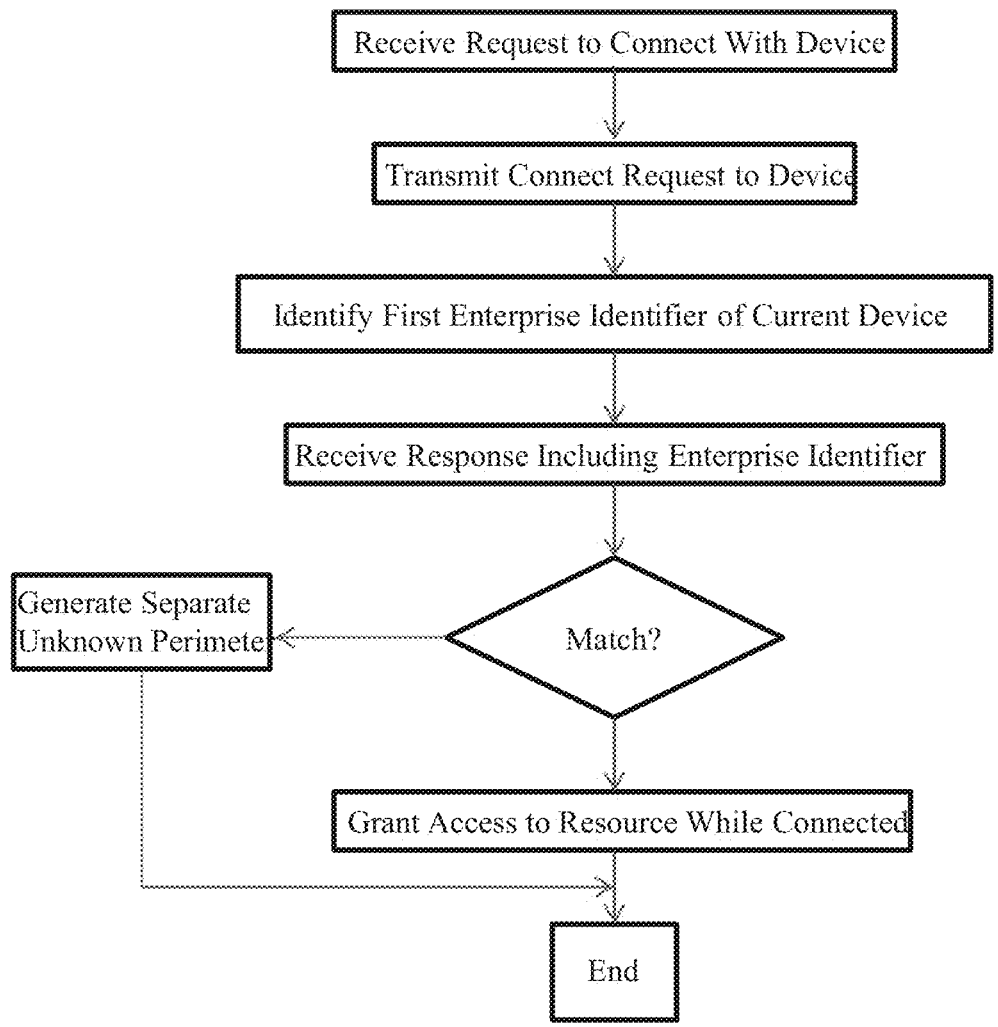
FIG. 4 is a flowchart illustrating an example method for granting access to resources while connecting to a network through a wireless connection with another device.

FIG. 4 is a flow chart illustrating an example method 400 for granting access to resources in an enterprise perimeter when connecting to a network through a wireless connection with another device. The illustrated method is described with respect to system 100 of FIG. 1, but this method could be used by any other suitable system. Moreover, the system 100 may use any other suitable techniques for manufacturing the system 100. Thus, some of the steps in this flowchart may take place concurrently and/or in a different sequence than as shown. System 100 may also use methods with additional steps, fewer steps, and/or different steps, so long as the methods remain appropriate.

Method 400 begins at step 402 where a request to enable access of a current device through a wireless connection with another device. For example, the device 102 in FIG. 1 may receive a request from a user to connect to device 104. At step 404, a request to connect is transmitted to the other device. In the example, the device 102 may wirelessly transmit to the device 104 a request to connect device 102 with a network through the device 104. Next, at step 406, an enterprise identifier for the current device is identified. Again in the example, the device 102 may identify an enterprise identifier assigned to the device in connection with generating the enterprise perimeter 110. A response indicating that the connecting request is received and identifying an enterprise identifier assigned to the other device at step 408. Again turning to the example, the device 104 may wirelessly transmit a response to the device 102 that indicates the connecting request is granted and an enterprise identifier assigned to the device 104. If the identifiers match at decisional step 410, then, at step 412, the current device grants access to resources in the enterprise perimeter. In some implementations, creation of duplicate or redundant perimeters can be advantageously avoided. In addition, a plurality of resources in an enterprise perimeter may be accessed when connecting to a network through a wireless connection with another device as compared to a perimeter for each resource. If the identifiers do not match, the device generates a separate unknown user perimeter including resources for accessing the account.

A number of embodiments of the invention have been described. Nevertheless, it will be understood that various modifications may be made without departing from the spirit and scope of the invention. Accordingly, other embodiments are within the scope of the following claims.

What is claimed is:

1. A method of accessing a resource, the method comprising:
receiving, by a first device, from an internal application executing on the first device, a request to enable the first device to access a server resource account of an enterprise through a direct wireless connection with a second device and cellular network access between the second device and a cellular network, wherein the first device includes a first enterprise perimeter associated with the internal application for accessing the server resource account and a first enterprise identifier and being configured to prevent resources external to the first enterprise perimeter from accessing resources associated with the first enterprise perimeter, and the first device includes the internal application and the resources external to the first enterprise perimeter;
wirelessly transmitting, to the second device, a request to the second device for a second enterprise identifier assigned to a second enterprise perimeter included in the second device and associated with the cellular network access between the second device and the cellular network;
receiving, from the second device, the second enterprise identifier; and
determining whether to grant access to the internal application for accessing the server resource account through the direct wireless connection with the second device and the cellular network access of the second enterprise perimeter based on a first enterprise identifier assigned to the first device and the second enterprise identifier assigned to the second device, wherein the determining whether to grant access comprises:
comparing the first enterprise identifier to the second enterprise identifier;
when the first enterprise identifier matches the second enterprise identifier, granting access to the internal application in the enterprise perimeter; and
when the first enterprise identifier does not match the second enterprise identifier, generating a separate unknown user perimeter access including resources to access an enterprise service.

2. The method of claim 1, further comprising:
transmitting a request to access the server resource account of the enterprise;
receiving information granting access to the server resource account and the first enterprise identifier; and
generating the first enterprise perimeter including resources for accessing the server resource account and the first enterprise identifier.

3. The method of claim 1, wherein the first enterprise identifier comprises a first email address, and the second enterprise identifier comprises a second email address.

4. The method of claim 1, further comprising:
identifying a first user identifier associated with the first device;
transmitting, to the second device, a request to the second device for a second user identifier associated with the second device; and
wherein determining whether to grant access to the internal application is based on the first enterprise identifier, the first user identifier, the second enterprise identifier, and the second user identifier.

5. The method of claim 1, wherein the enterprise service comprises at least one of a data file or an application.

6. A mobile device, comprising:
one or more processors operable to:
receiving, by the mobile device, from an internal application executing on the mobile device, a request to enable the mobile device to access a server resource account of an enterprise through a direct wireless connection with a second device and cellular network access between the second device and a cellular network, wherein the mobile device includes a first enterprise perimeter associated with the internal application for accessing the server resource account and a first enterprise identifier and being configured to prevent resources external to the first enterprise perimeter from accessing resources associated with the first enterprise perimeter, and the mobile device includes the internal application and the resources external to the first enterprise perimeter;
wirelessly transmitting, to the second device, a request to the second device for a second enterprise identifier assigned to a second enterprise perimeter included in the second device and associated with the cellular network access between the second device and the cellular network;
receiving, from the second device, the second enterprise identifier and
determining whether to grant access to the internal application for accessing the server resource account through the direct wireless connection with the second device and the cellular network access of the second enterprise perimeter based on a first enterprise identifier assigned to the mobile device and the second enterprise identifier assigned to the second device, wherein the determining whether to grant access comprises:
comparing the first enterprise identifier to the second enterprise identifier;
when the first enterprise identifier matches the second enterprise identifier, granting access to the internal application in the enterprise perimeter; and
when the first enterprise identifier does not match the second enterprise identifier, generating a separate unknown user perimeter access including resources to access an enterprise service.

7. The mobile device of claim 6, the one or more processors being further operable to:
transmit a request to access the server resource account of the enterprise;
receive information granting access to the server resource account and the first enterprise identifier; and
generate the first enterprise perimeter including resources for accessing the server resource account and the first enterprise identifier.

8. The mobile device of claim 6, wherein the first enterprise identifier comprises a first email address, and the second enterprise identifier comprises a second email address.

9. The mobile device of claim 6, the one or more processors being further operable to:
identify a first user identifier associated with the mobile device;
transmit, to the second device, a request to the second device for a second user identifier associated with the second device; and
wherein the processors operable to determine whether to grant access to the internal application is based on the first enterprise identifier, the first user identifier, the second enterprise identifier, and the second user identifier.

10. The mobile device of claim 6, wherein the enterprise service comprises one or more files.

11. A computer program product encoded on a tangible, non-transitory storage medium, the product comprising computer readable instructions for causing one or more processors to perform operations comprising:
receiving, by a first device, from an internal application executing on the first device, a request to enable the first device to access a server resource account of an enterprise through a direct wireless connection with a second device and cellular network access between the second device and a cellular network, wherein the first device includes a first enterprise perimeter associated with the internal application for accessing the server resource account and a first enterprise identifier and being configured to prevent resources external to the first enterprise perimeter from accessing resources associated with the first enterprise perimeter, and the first device includes the internal application and the resources external to the first enterprise perimeter;
wirelessly transmitting, to the second device, a request to the second device for a second enterprise identifier assigned to a second enterprise perimeter included in the second device and associated with the cellular network access between the second device and the cellular network;
receiving, from the second device, the second enterprise identifier; and
determining whether to grant access to the internal application for accessing the server resource account through the direct wireless connection with the second device and the cellular network access of the second enterprise perimeter based on a first enterprise identifier assigned to the first device and the second enterprise identifier assigned to the second device, wherein the determining whether to grant access comprises:
comparing the first enterprise identifier to the second enterprise identifier;
when the first enterprise identifier matches the second enterprise identifier, granting access to the internal application in the enterprise perimeter; and
when the first enterprise identifier does not match the second enterprise identifier, generating a separate unknown user perimeter access including resources to access an enterprise service.

12. The computer program product of claim 11, instructions for causing one or more processors to further perform operations comprising:
transmitting a request to access the server resource account of the enterprise;
receiving information granting access to the server resource account and the first enterprise identifier; and
generating the first enterprise perimeter including resources for accessing the server resource account and the first enterprise identifier.

13. The computer program product of claim 11, wherein the first enterprise identifier comprises a first email address, and the second enterprise identifier comprises a second email address.

14. The computer program product of claim 11, instructions for causing one or more processors to further perform operations comprising:
identifying a first user identifier associated with the first device;
transmitting, to the second device, a request to the second device for a second user identifier associated with the second device; and wherein the instructions for causing one or more processors to perform operations comprising determining whether to grant access to the internal application is based on the first enterprise identifier, the first user identifier, the second enterprise identifier, and the second user identifier.

15. The computer program product of claim 11, wherein the enterprise service comprises one or more files.

16. A system, comprising:
a first mobile device configured to receive, from an internal application executing on the first mobile device, a request to enable access a server resource account of an enterprise through a direct wireless connection with a second device and cellular network access between the second device and a cellular network, wherein the first mobile device includes a first enterprise perimeter associated with the internal application for accessing the server resource account and a first enterprise identifier and configured to prevent resources external to the first enterprise perimeter from accessing resources associated with the first enterprise perimeter, and the first device includes the internal application and the resources external to the first enterprise perimeter, wirelessly transmit a request to the second device for a second enterprise identifier assigned to a second enterprise perimeter included in the second device and associated with the cellular network access between the second device and the cellular network, receive, from the second device, the second enterprise identifier; and determine whether to grant access to the internal application for accessing the server resource account through the direct wireless connection with the second device and the cellular network access of the second enterprise perimeter based on a first enterprise identifier assigned to the first device and the second enterprise identifier assigned to the second device, where the determination of whether to grant access comprises:

comparing the first enterprise identifier to the second enterprise identifier;
when the first enterprise identifier matches the second enterprise identifier, granting access to the internal application in the enterprise perimeter; and
when the first enterprise identifier does not match the second enterprise identifier, generating a separate unknown user perimeter access including resources to access an enterprise service; and
the second device configured to connect the first mobile device to the cellular network.

17. The system of claim 16, the first mobile device further configure to:
transmit a request to access the server resource account of the enterprise;
receive information granting access to the server resource account and the first enterprise identifier; and
generate the first enterprise perimeter including resources for accessing the server resource account and the first enterprise identifier.

18. The system of claim 16, wherein the first enterprise identifier comprises a first email address, and the second enterprise identifier comprises a second email address.

19. The system of claim 16, the first mobile device further configure to:
identify a first user identifier associated with the first device;
transmit, to the second device, a request to the second device for a second user identifier associated with the second device; and
wherein the first mobile device configured to determine whether to grant access to the internal application is based on the first enterprise identifier, the first user identifier, the second enterprise identifier, and the second user identifier.

20. The system of claim 16, wherein the enterprise service comprises at least one of a data file or an application.

* * * * *